(12) United States Patent
Tickner et al.

(10) Patent No.: US 11,280,459 B2
(45) Date of Patent: Mar. 22, 2022

(54) LIGHT-EMITTING DIODE DOWN LIGHT RETROFIT FIXTURES

(71) Applicant: SIGNIFY HOLDING B.V., Eindhoven (NL)

(72) Inventors: Jerold Alan Tickner, Newnan, GA (US); Kevin Roy Harpenau, Peachtree City, GA (US); Russell Bryant Green, Douglasville, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 142 days.

(21) Appl. No.: 16/430,066

(22) Filed: Jun. 3, 2019

(65) Prior Publication Data
US 2019/0285259 A1    Sep. 19, 2019

Related U.S. Application Data

(63) Continuation of application No. 14/603,834, filed on Jan. 23, 2015, now Pat. No. 10,309,632, which is a (Continued)

(51) Int. Cl.
*F21S 8/02*    (2006.01)
*F21V 29/15*    (2015.01)
(Continued)

(52) U.S. Cl.
CPC ............... *F21S 8/026* (2013.01); *F21K 9/61* (2016.08); *F21S 8/043* (2013.01); *F21V 19/001* (2013.01);
(Continued)

(58) Field of Classification Search
CPC ......... F21S 8/026; F21S 8/043; F21V 23/026; F21V 23/007; F21V 23/06; F21V 29/15; F21V 21/04; F21V 19/04
See application file for complete search history.

(56) References Cited

U.S. PATENT DOCUMENTS 6,435,691 B1    8/2002    Macey
7,828,465 B2    11/2010    Roberge et al.
(Continued)

FOREIGN PATENT DOCUMENTS

| RU | 114509 | 3/2012 |
|---|---|---|
| WO | WO 2008/137732 | 11/2008 |
| WO | WO 2012/122704 A1 | 9/2012 |

OTHER PUBLICATIONS

International Search Report for PCT/US2013/059084 dated Dec. 12, 2013.

*Primary Examiner* — Anabel Ton

(57) ABSTRACT

A system for mounting a light emitting diode (LED) wave guide down light retrofit fixture. The system can include a mounting plate having a number of apertures symmetrically positioned around a center of the mounting plate. The system can also include at least one fastening device mechanically coupled to an upper surface of the mounting plate using at least a first aperture of the apertures, where the at least one fastening device mechanically couples to a base of an existing fixture. The system can further include a coupling device mechanically coupled to a lower surface of the mounting plate. The system can also include a trim assembly having a frame and a LED light source mechanically coupled to the frame. The frame can have a coupling feature disposed on a top surface of the frame, where the coupling feature mechanically couples to the coupling device.

15 Claims, 7 Drawing Sheets

Related U.S. Application Data continuation of application No. 13/795,631, filed on Mar. 12, 2013, now Pat. No. 9,188,318.

(60) Provisional application No. 61/717,386, filed on Oct. 23, 2012, provisional application No. 61/699,965, filed on Sep. 12, 2012.

(51) Int. Cl.

| | | |
|---|---|---|
| *F21K 9/61* | (2016.01) | |
| *F21S 8/04* | (2006.01) | |
| *F21V 19/00* | (2006.01) | |
| *F21V 21/03* | (2006.01) | |
| *F21V 21/04* | (2006.01) | |
| *F21V 23/06* | (2006.01) | |
| *F21V 8/00* | (2006.01) | |
| *F21V 23/02* | (2006.01) | |
| *F21V 23/00* | (2015.01) | |
| *F21V 19/04* | (2006.01) | |
| *F21Y 115/10* | (2016.01) | |

(52) U.S. Cl.
CPC .............. *F21V 21/03* (2013.01); *F21V 21/04* (2013.01); *F21V 23/007* (2013.01); *F21V 23/026* (2013.01); *F21V 23/06* (2013.01); *F21V 29/15* (2015.01); *G02B 6/0031* (2013.01); *F21V 19/04* (2013.01); *F21V 2200/20* (2015.01); *F21Y 2115/10* (2016.08)

(56) References Cited

U.S. PATENT DOCUMENTS

| | | |
|---|---|---|
| 8,231,258 B2 | 7/2012 | Kim |
| 8,414,164 B2 | 4/2013 | Ogawa |
| 9,188,318 B2 | 11/2015 | Tickner |
| 2003/0210551 A1* | 11/2003 | Sevack ................ F21V 17/162 362/365 |
| 2003/0223232 A1 | 12/2003 | Belfer et al. |
| 2007/0263393 A1* | 11/2007 | Van de Ven ............ F21V 7/005 362/362 |
| 2010/0014289 A1 | 1/2010 | Thomas et al. |
| 2010/0110699 A1 | 5/2010 | Chou |
| 2011/0075414 A1* | 3/2011 | Van de Ven ............ F21V 15/01 362/235 |
| 2011/0241559 A1 | 10/2011 | Grajcar |
| 2012/0020108 A1 | 1/2012 | Chang |
| 2012/0294007 A1* | 11/2012 | Matsumoto ............ F21S 8/026 362/249.02 |
| 2013/0286653 A1 | 10/2013 | Holman |

* cited by examiner

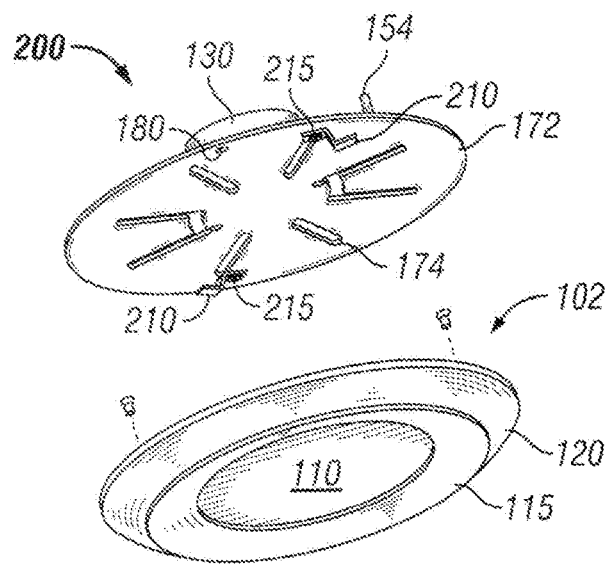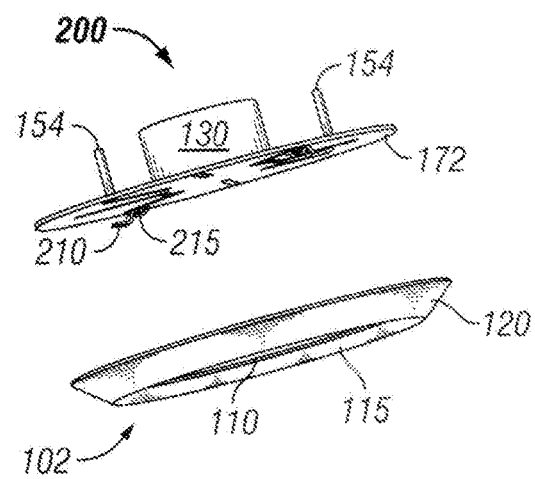
*FIG. 2A*  *FIG. 2B*
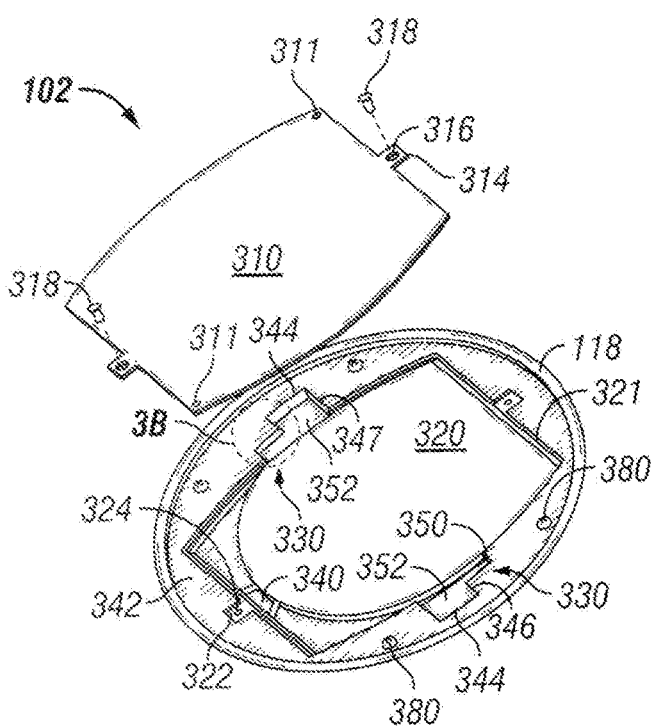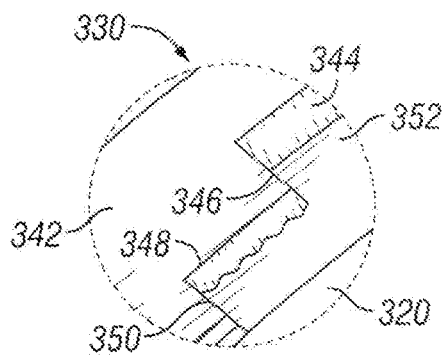
*FIG. 3A*  *FIG. 3B*

LIGHT-EMITTING DIODE DOWN LIGHT RETROFIT FIXTURES

CROSS-REFERENCE TO RELATED APPLICATIONS

This application is a continuation application of, and claims priority under 35 U.S.C. § 120 to, U.S. patent application Ser. No. 14/603,834, titled "Light-Emitting Diode Wave Guide Down Light Retrofit Fixtures" and filed on Jan. 23, 2015, which is a continuation application of and claims priority to U.S. patent application Ser. No. 13/795,631, titled "Light-Emitting Diode Wave Guide Down Light Retrofit Fixtures" and filed on Mar. 12, 2013, which claims priority under 35 U.S.C. § 119 to: 1) U.S. Provisional Patent Application Ser. No. 61/699,965, titled "Light-Emitting Diode Retrofit Wave Guide Down Light Fixtures for Down Cans and Junction Boxes" and filed on Sep. 12, 2012, and 2) U.S. Provisional Patent Application Ser. No. 61/717,386, titled "Stingray Waveguide Light Fixtures" and filed on Oct. 23, 2012. The entire contents of these aforementioned applications are hereby incorporated herein by reference.

TECHNICAL FIELD

Embodiments described herein relate generally to light emitting diode (LED) fixtures, and more particularly to systems, methods, and devices for retrofitting traditional fixtures with LED fixtures.

BACKGROUND

People with light fixtures at times replace one or more of these fixtures. Replacing a light fixture often requires decoupling the old fixture both mechanically and electrically and coupling the new fixture both mechanically and electrically in the area that the fixture will be positioned. Many consumers are not comfortable with personally handling electrical issues, which can result in them delaying replacement of the fixture and/or having to hire an experienced electrician to help them with the replacement. Replacement of the fixture can also entail painting or repairing a wall or other surface that the replacement fixture is being coupled to and can result in other additional expenses. In addition, many light fixtures use lighting technologies that are not as efficient and/or effective as LED-based lighting systems.

SUMMARY

In general, in one aspect, the disclosure relates to a system for mounting a light emitting diode (LED) wave guide down light retrofit fixture. The system can include a mounting plate having a number of apertures positioned on the mounting plate. The system can also include at least one fastening device mechanically coupled to an upper surface of the mounting plate using at least a first aperture, where the at least one fastening device mechanically couples to a base of an existing fixture. The system can further include at least one coupling device mechanically coupled to a bottom surface of the mounting plate. The system can also include a trim assembly. The trim assembly can include a frame having at least one coupling feature disposed on a top surface of the frame, where the at least one coupling feature mechanically couples to the at least one coupling device. The trim assembly can also include a LED light source mechanically coupled to the frame.

In another aspect, the disclosure can generally relate to a light emitting diode (LED) wave guide down light fixture. The LED wave guide down light fixture can include a mounting plate, and a LED driver that lacks a charge transfer device. The LED wave guide down light fixture can also include a trim assembly mechanically coupled to the mounting plate and having a backing member and at least one thermally conductive material. The LED wave guide down light fixture can further include a circuit board mechanically coupled to the backing member and electrically coupled to the LED driver. The LED wave guide down light fixture can also include a LED array mechanically and electrically coupled to the circuit board. The LED wave guide down light fixture can further include a wave guide positioned adjacent to the LED array and mechanically coupled to the trim assembly. The power delivered to the LED array by the LED driver can be at least 100V alternating current (AC).

In yet another aspect, the disclosure can generally relate to a light emitting diode (LED) light fixture. The LED fixture can include a mounting plate having a mechanical coupling feature disposed on a top surface of the mounting plate. The LED fixture can also include a LED driver removably coupled to the mounting plate, where the LED driver has a mechanical fastening feature that removably couples to the mechanical coupling feature of the mounting plate. The LED driver can be mechanically coupled to the mounting plate without using of a tool.

These and other aspects, objects, features, and embodiments will be apparent from the following description and the appended claims.

BRIEF DESCRIPTION OF THE DRAWINGS

The drawings illustrate only example embodiments of LED wave guide down light retrofit fixtures and are therefore not to be considered limiting of its scope, as the LED wave guide down light retrofit fixtures may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIGS. 2A and 2B show various views of an alternative example LED wave guide down light retrofit fixture for a junction box in accordance with certain example embodiments.

FIGS. 3A and 3B show various views of an example trim assembly for a LED wave guide down light retrofit fixture in accordance with certain example embodiments.

DETAILED DESCRIPTION OF EXAMPLE EMBODIMENTS

Figure 1A:
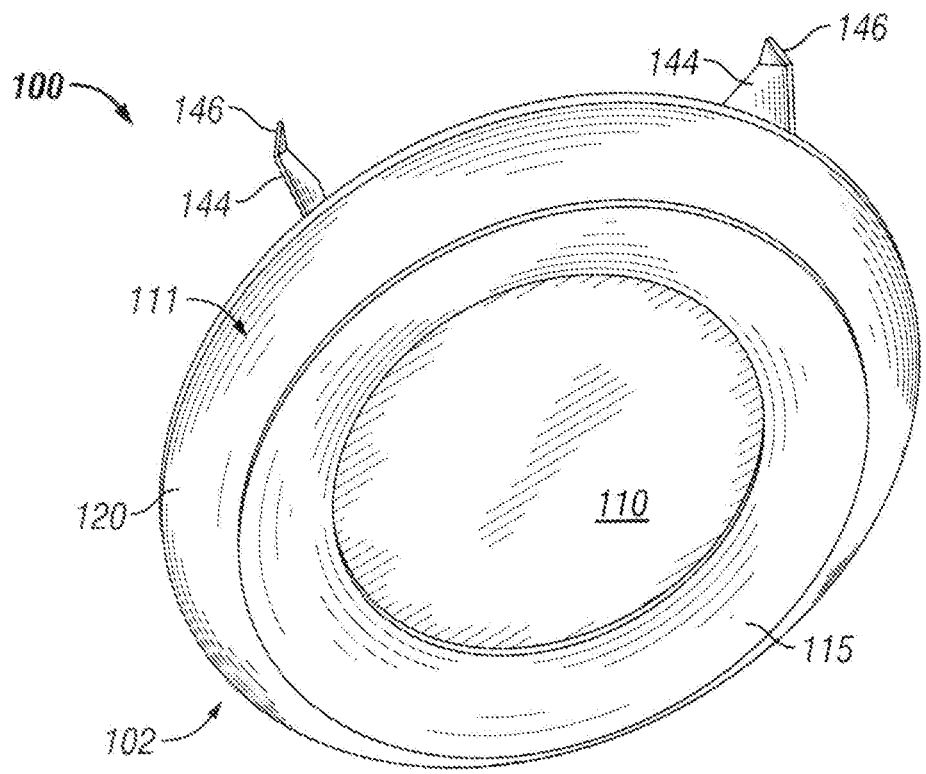
FIGS. 1A-1E show various views of an example LED wave guide down light retrofit fixture for a down can in accordance with certain example embodiments.

The example embodiments discussed herein are directed to systems, apparatuses, and methods of retrofitting existing fixtures with LED wave guide down light fixtures. Such existing fixtures can have one or more of a number of types of socket into which one or more light sources are electrically and mechanically coupled. Examples of types of sockets can include, but are not limited to, an Edison screw base of any diameter (e.g., E26, E12, E 14, E39), a bayonet style base, a bi-post base, a bi-pin connector base, a wedge base, and a fluorescent tube base. A light source of the existing fixture can electrically and mechanically couple to the socket and can be of a light source type that corresponds to the type of socket. Examples of light source types of the light source can include, but are not limited to, incandescent lamps, LEDs, halogen lamps, G10/GU10, G9/GU9, AR111/PAR36, T3, MR-11, and MR-16. If the light source of the existing fixture is a LED, the LED can be of one or more of a number of types of LED technology, including but not limited to discrete LEDs, LED arrays, chip-on-board LEDs, edge lit LED panels, and surface mounted LEDs.

Such existing fixtures can be mounted in a junction box (also called a j-box), a down can, or some other base for the fixture. In certain example embodiments, the junction box, down can, or other base is mounted in a ceiling or other surface so that the light emitted by the fixture is directed outward away from the surface. For example, for a fixture mounted in a ceiling, the light emitted by the fixture is directed downward (down light), away from the ceiling. Such a base for an existing fixture can be electrically coupled to a power source to provide power and/or control to the light fixture. The power source can provide the existing fixture with one or more of a number (and/or a range) of voltages, including but not limited to 120 V alternating current (AC), 110 VAC, 240 VAC, 24 V direct current (DC), and 0-10 VDC.

A base of an existing fixture can be of a standard size or a non-standard size. For example, if the base is a down can, some standard sizes can include a 4 inch down can, a 5 inch down can, and a 6 inch down can. In any case, example embodiments described herein are adjustable and adaptable to fit within any base of any size, whether such size is standard or non-standard.

Such existing fixtures can be of any size and/or shape, and can have any number of sockets. Such existing fixtures can be located indoor and/or outdoors and can be mounted to a surface (e.g., wall, ceiling, pillar), be part of a lamp, or be used with any other suitable mounting instrument where a down light is used. Such existing fixtures can be used in residential, commercial, and/or industrial applications. Such existing fixtures can operate from a manual fixture (e.g., on/off switch, dimming switch, pull chain), a photocell, a timer, and/or any other suitable mechanism.

When an example LED retrofit fixture is retrofitted over an existing fixture, the base (e.g., the junction box, the down can) of the existing fixture can remain as part of the LED retrofit fixture, while the remaining components of the existing fixture are removed. For example, while the junction box of an existing fixture remains in place, the socket, the lens, and the light source of the existing fixture are removed. In certain example embodiments, at least the light source of the existing fixture is replaced by the example LED retrofit fixture. In certain example embodiments, the base of the existing fixture is removed and/or modified by the example LED retrofit fixture.

While example embodiments described herein are directed to LED retrofit fixtures using at least a base of an existing fixture, example embodiments can also be applied to new fixtures that do not use any part of an existing fixture. Thus, example embodiments described herein should not be limited only to retrofit fixtures. Further, certain example embodiments can be used with fixtures that use a lighting technology other than LEDs. For example, example embodiments can be used with organic LEDs. Thus, example embodiments should not be limited to fixtures that use LED technology.

Example embodiments for retrofitting existing fixtures with LED wave guide down light fixtures will be described more fully hereinafter with reference to the accompanying drawings, in which example embodiments of retrofitting existing fixtures with LED wave guide down light fixtures are shown. Retrofitting existing fixtures with LED wave guide down light fixtures may, however, be embodied in many different forms and should not be construed as limited to the example embodiments set forth herein. Rather, these example embodiments are provided so that this disclosure will be thorough and complete, and will fully convey the scope of retrofitting existing fixtures with LED wave guide down light fixtures to those or ordinary skill in the art. Like, but not necessarily the same, elements (also sometimes called components) in the various figures are denoted by like reference numerals for consistency.

FIGS. 1A-E show a various views of an example LED wave guide down light retrofit fixture 100 (also called a LED retrofit fixture 100) for a base of an existing fixture, where the base is a down can, in accordance with certain example embodiments. The LED retrofit fixture 100 includes a trim assembly 102, a LED driver 130, a mounting plate 172, and at least one bracket 140. In one or more embodiments, one or more of the components shown in FIGS. 1A-1E may be omitted, repeated, and/or substituted. Accordingly, embodiments of a LED retrofit fixture should not be considered limited to the specific arrangements of components shown in FIGS. 1A-1E.

Referring now to FIGS. 1A-E, the trim assembly 102 includes a wave guide assembly 110, and a frame 111. In certain example embodiments, the frame 111 is made of thermally conductive material. In such a case, the frame 1111 is thermally coupled to the wave guide assembly 110 and/or the LED driver 130, and acts as a heat sink. Specifically, the frame 111 can dissipate heat generated by the wave guide assembly 110 and/or LED driver 130. The frame 111 and can include one or more features (e.g., fins, fans, synthetic jets) for active or passive cooling of the fixture. For example, the frame 111 can have an outer surface that includes a smooth outer segment 120 that joins at an angle with a smooth inner segment 115.

The top side (i.e., the side facing toward from the LED driver 130) of the frame 111 can have a lip 118 that has a shape and size. The mounting plate 172 can have substantially the same shape as the lip 118, but be of a slightly smaller size than the size of the inner perimeter of the lip 118. In such a case, the mounting plate 172 can fit snugly inside of the lip 118 on the top side of the frame 111. The lip 118 can also have a width (distance between the inner perimeter and the outer perimeter) or thickness. The frame 111 can be made from one or more of a number of suitable materials, including but not limited to metal, plastic, and ceramic. The frame 111 (as well as the rest of the trim assembly 102) can be a cast fixture of made from multiple pieces that are mechanically coupled to each other.

The remainder of the trim assembly 102 is described in more detail below with respect to FIGS. 3A and 3B. In certain example embodiments, the mounting plate 172 has a number of apertures that traverse the thickness of the mounting plate 172. An aperture in the mounting plate 172 can be a hole (e.g., aperture 180, aperture 190), a slot 174 having a straight segment, a slot 174 having a curved segment, some other suitable aperture that traverses the mounting plate 172, or any combination thereof. For example, the example mounting plate 172 is mechanically coupled to the trim assembly 102 using one or more fastening devices (e.g., screw, bolt) that traverse an aperture 180 in the mounting plate 172 and at least part of a corresponding aperture in the trim assembly 102 to couple the mounting plate 172 to the trim assembly 102.

As another example, one or more slots 174 disposed on the mounting plate 172 can be used to adjustably fasten one or more brackets 140 to the mounting plate 172. In certain example embodiments, a bracket 140 is any type of fastening device that includes one or more features that allow the bracket 140 to mechanically couple to a base of an existing fixture. Specifically, when one portion of the bracket 140 is mechanically coupled to the mounting plate 172, another portion of the bracket 140 can be used to mechanically couple the LED retrofit fixture 100 to a base (e.g., a down can, a junction box) of an existing fixture.

Figure 1B:
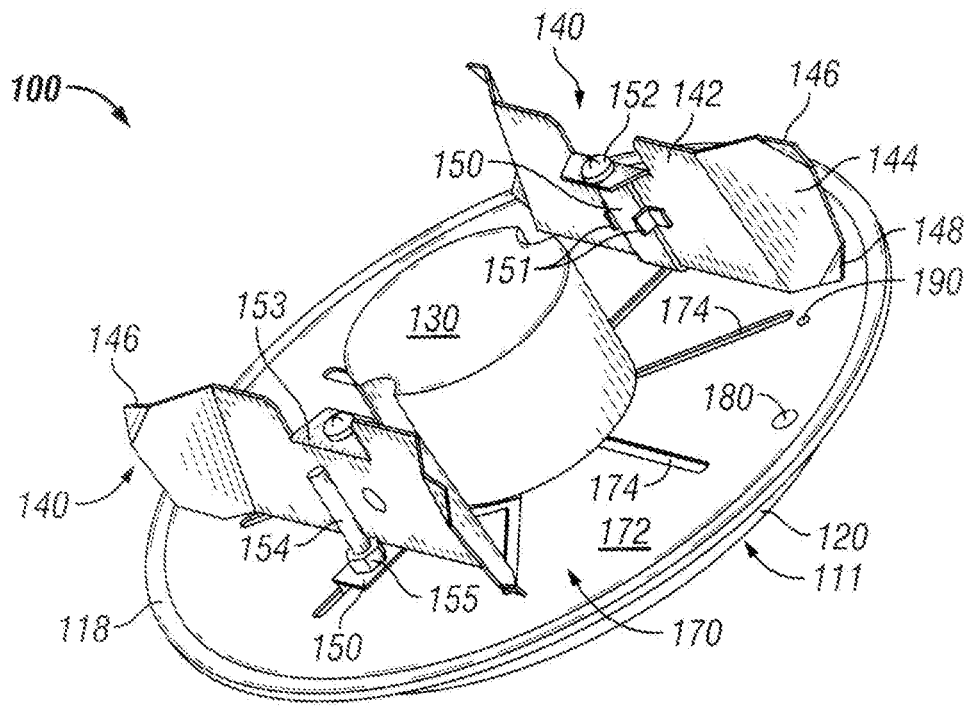
Figure 1C:
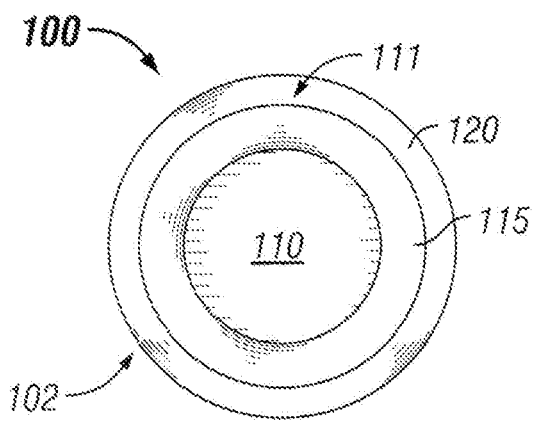

Each bracket 140 can include one or more features that allow the bracket 140 to couple to the base of an existing fixture. For example, as shown in FIG. 1B, a bracket 140 can have a central portion 142 with a wing 144 that extends on one or both ends of the central portion 142 at some angle relative to the central portion 142. In addition, the wing 144 can have a top protrusion 146 that extends at some angle relative to the wing 144 and/or a bottom protrusion 148 that extends at some angle relative to the wing 144. The wing 144, top protrusion 146, and/or bottom protrusion 148 can be angled and positioned in such a way as to allow the bracket 140 to mechanically couple to a base of an existing fixture and/or the mounting plate 172.

Figure 1D:
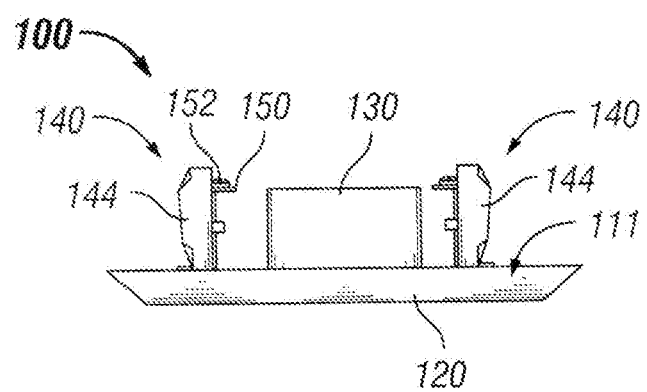
Figure 1E:
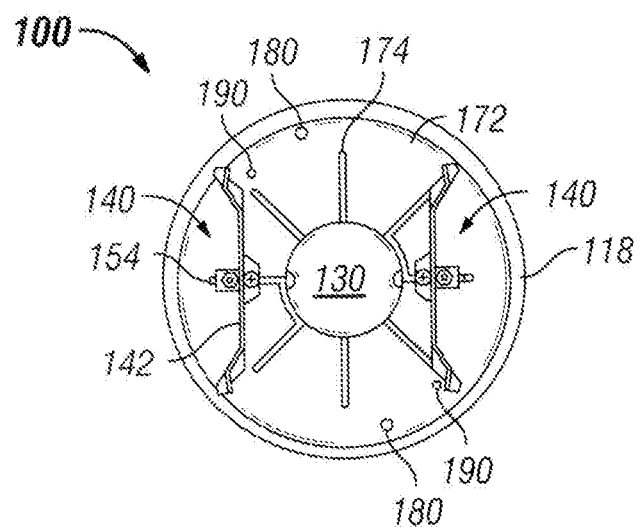

In certain example embodiments, the bracket 140 includes one or more of a number of features that allow the bracket 140 to be mechanically coupled, directly or indirectly, to the upper or top surface of the mounting plate 172. Such features can include, but are not limited to, tabs, slots, clips, and mating threads. For example, as shown in FIGS. 1B, 1D, and 1E, the bracket can include one or more tabs 151 that can be disposed on the central portion 142. The tabs 151 can be used to hold a mounting bracket 150 in place relative to the bracket 140.

The example mounting bracket 150 can be of any height (e.g., the mounting bracket 150 can traverse a height of the central portion 142) and mechanically couple to a different feature of the bracket 140. As an example of such a feature, the bracket 140 can include a cutout feature 153 of the central portion 142. The mounting bracket 150 can be mechanically coupled to the cutout feature 153 of the central portion 142 using one or more fastening devices 152 (e.g., screw, bolt, nut). The mounting bracket 150 can also have a fold of some angle (e.g., approximately 90°, as shown in FIG. 1B) to allow a portion of the mounting bracket 150 to pass under the central portion 142.

In certain example embodiments, the central portion 142 and the mounting bracket 150 are aligned with one of the slots 174 in the mounting plate 172. In such a case, one or more fastening devices can be used to secure the mounting bracket 150 (and thus the bracket 140) to the upper surface of the mounting plate 172. For example, as shown in FIG. 1B, an extended bolt 154 traverses a portion of the slot 174 in the mounting plate 172 and extends toward the top side of the bracket 140. A nut 155 is threadably coupled to the extended bolt 154 and tightened against the mounting bracket 150 to secure the bracket 140 to the mounting plate 172.

In certain example embodiments, the bracket 140 can be mechanically coupled to the bottom surface of the mounting plate 172. For example, tabs (or some other feature) disposed on the bottom of the bracket 140 can protrude through corresponding apertures that traverse the mounting plate 172. In such a case, one or more fastening devices and/or other coupling devices and/or features can be used to mechanically couple the bracket 140 to the bottom surface of the mounting plate 172. In such a case, because the bracket 140 extends away from the upper surface of the mounting plate 172, the bracket 140 can be said to be mechanically coupled to the upper surface of the mounting plate 172.

The fastening devices (e.g., extended bolt 154, nut 155) used to couple the bracket 140 to the mounting plate 172 can be loosened and/or removed periodically by a user. In such a case, the bracket 140 can be moved to properly fit within the base (e.g., down can) of an existing fixture. For example, as shown in FIG. 1B, the bracket 140 can slide along one or more slots 174 in the mounting plate 172 when the nut 155 is loosened. When the bracket 140 is positioned in the proper place on the mounting plate 172 for the size (e.g., 4 inches, 5 inches, 6 inches) of the base of the existing fixture, then the nut 155 can be tightened to keep the bracket 140 in place.

Further, in addition to the fastening devices (e.g., extended bolt 154, nut 155), the bracket 140 can be slidably and or fixedly coupled to the mounting plate 172 using a bottom protrusion 148, which can at least partially traverse an aperture (e.g., hole 180, slot 174) in the mounting plate 172. In certain example embodiments, the top surface and/or bottom surface of the mounting plate 172 can have one or more features (e.g., detents, scoring) that properly align each bracket 140 in the proper position on the mounting plate 172 for a given size of base of an existing fixture.

For example, a number of detents can be positioned (e.g., disposed along the top surface of the mounting plate 172) adjacent to one or more of the slots 174. In such a case, each detent can receive a bottom portion of the bracket 140. Each detent can correspond to a size of the base of an existing fixture. Each detent can also be labeled (e.g., engraving on the upper surface of the mounting plate 172 adjacent to the corresponding detent) to identify the size of the base for a particular detent.

The mounting plate 172, bracket 140, and the mounting bracket 150 can be made of one or more of a number of materials, including but not limited to plastic, metal, rubber, and ceramic. Further, the various features of the bracket 140 (e.g., central portion 142, wings 144, tabs 151, cutout feature 153) can be made from a single piece (as from a mold) and/or can be separate pieces that are mechanically coupled to each other using one or more coupling methods, including but not limited to epoxy, welding, rivets, compression fittings, and fastening devices.

In addition, in certain example embodiments, the LED driver 130 is mechanically coupled to the mounting plate 172. For example, as shown in FIGS. 1B, 1D, and 1E, the LED driver 130 can be mounted on the top surface of the mounting plate 172. The LED driver 130 can be mounted to the mounting plate 172 using one or more of a number of fastening devices, including but not limited to clips, brackets, screws, bolts, mating threads, and rivets. The LED driver 130 can be mounted in substantially the center of the mounting plate 172. In addition, if there are multiple brackets 140, the brackets 140 can be positioned substantially equidistantly around the LED driver 130. In other words, the brackets 140 (e.g., two brackets 140, three brackets 140, four brackets 140) can be coupled to the mounting plate 172 symmetrically around the center of the mounting plate 172.

The LED driver 130 can include one or more of a number of components (e.g., transformer, resistor, capacitor, integrated circuit) that can be discrete components, components integrated with a circuit board, and/or functions performed by components that are programmed into a hardware processor. The LED driver 130 is electrically coupled to the LEDs (also collectively called a LED light source). As shown below with respect to FIGS. 7B and 8, the LED light source can be mechanically coupled to the frame 111 of the trim assembly 102. The LED driver 130 receives power and/or control information from a power source (or a switch or control device communicably coupled to the LED driver 130) that feeds the existing fixture, converts the power and/or control to a corresponding signal (e.g., voltage, current), and sends the corresponding signal to the LED light source to control the operational characteristics of the LED light source. Alternatively, or in addition, the LED driver 130 can be a source of power (e.g., a battery) that is independent of the power source that feeds the existing fixture.

In certain example embodiments, the LED driver 130 is located inside the LED retrofit fixture 100. In such a case, the LED driver 130 can be mounted to the lower or bottom surface of the mounting plate 172. Further, in such a case, the profile of the LED driver 130 can be lower and/or the height of the trim assembly 102 can be higher. Alternatively, the LED driver 130 can be located remotely from the LED retrofit fixture 100 using wired and/or wireless technology.

FIGS. 2A and 2B show various views of an alternative LED wave guide down light retrofit fixture 200 (also called a LED retrofit fixture 200) for a base of an existing fixture, where the base is a junction box, in accordance with certain example embodiments. Specifically, FIGS. 2A and 2B show a partially exploded perspective side view of the LED retrofit fixture 200. The various features of the LED retrofit fixture 200 are substantially the same as the corresponding features of the LED retrofit fixture 100 of FIGS. 1A-1E, with exceptions as described below. In one or more embodiments, one or more of the components shown in FIGS. 2A and 2B may be omitted, repeated, and/or substituted. Accordingly, embodiments of a LED retrofit fixture should not be considered limited to the specific arrangements of components shown in FIGS. 2A and 2B.

Specifically, for mechanically coupling the LED retrofit fixture 200 to the base (in this case, a junction box) of an existing fixture, rather than the use of one or more brackets 140, one or more extended bolts 154 are used. The extended bolts 154 can be the same as those described above with respect to FIGS. 1A-1E and can be mechanically coupled to corresponding receiving features incorporated with, or attached to, the junction box.

In addition, FIGS. 2A and 2B show details of coupling devices 210 that are mechanically coupled to the bottom surface of the mounting plate 172. Each coupling device 210 can be coupled to the mounting plate 172 using one or more fastening devices 215 (e.g., screw, bolt, rivet). Such fastening devices 215 can be loosened and/or removed to adjust the position of the corresponding coupling device 210. Each coupling device 210 extends away from the bottom surface of the mounting plate 172 (for example, in a substantially perpendicular direction from the mounting plate 172) by some distance. In addition, the distal end of the coupling device 210 can be substantially parallel to (or form some other angle relative to) the coupling feature 210. Such a configuration of the coupling device 210 can allow a corresponding feature (described below with respect to FIGS. 3A and 3B) in the trim assembly 102 to be removably coupled to the coupling device 210 while allowing for a minimal air gap between the bottom of the mounting plate 172 and the top of the trim assembly 102.

For example, the coupling devices 210 shown in FIGS. 2A and 2B can be twist lock spring clips that slidably couple with ramps in the top portion of the trim assembly 102. In such a case, the trim assembly 102 can be rotatably coupled to the mounting plate 172 by positioning the coupling devices 210 in the ramp openings and rotating the trim assembly 102 in a certain direction (e.g., counter-clockwise). To decouple the trim assembly 102 from the mounting plate 172, the trim assembly 102 can be rotated in an opposite direction (e.g., clockwise). The same or similar coupling devices 210 can be disposed on the bottom surface of the mounting plate 172 of the LED retrofit fixture 100 described above with respect to FIGS. 1A-1E to rotatably couple the coupling device 210 (and thus the mounting plate 172) to the trim assembly 102.

FIGS. 3A and 3B show various views of an example trim assembly 102 for a LED wave guide down light retrofit fixture (e.g., LED retrofit fixture 100, LED retrofit fixture 200) in accordance with certain example embodiments. Specifically, FIG. 3A shows an exploded top perspective view of the trim assembly 102, and FIG. 3B shows details of a receiving feature 330 for the trim assembly 102. In one or more embodiments, one or more of the components shown in FIGS. 3A and 3B may be omitted, repeated, and/or substituted. Accordingly, embodiments of a trim assembly should not be considered limited to the specific arrangements of components shown in FIGS. 3A and 3B.

Referring to FIGS. 1A through 3B, the top of the trim assembly 102 can include a reflector plate 310, the lip 118, a top surface 342, and one or more receiving features 330. The top surface 342 can be part of the frame and be made of one or more thermally conductive materials. The top surface 342 can have one or more apertures 380 that traverse at least a portion of the top surface 342. The apertures 380 can correspond to the apertures 180 of the mounting plate 172. The apertures 380 in the top surface 342 can also include a standoff that is at least as tall as (or substantially the same height as) the height of the lip 118 relative to the top surface 342. Such a standoff can create and allow for a minimal air gap between the top surface 342 and the mounting plate 172.

In certain example embodiments, the receiving features 330 mechanically couple to the coupling features 210 of the mounting plate 172. As described above, the mechanical coupling between the receiving features 330 and the coupling features 210 allow the trim feature 102 to move (e.g., rotatably) relative to, and/or be decoupled from, the mounting plate 172. For example, the receiving features 330 shown in FIGS. 3A and 3B can be ramps. Specifically, the coupling feature 210 is positioned within a space 352 surrounded by a side of the reflector plate 310, a side wall 344 opposite the reflector plate 310, a back wall 347, and a split front wall 346 and 350, where the side wall 344, the back wall 347, and the split front wall 346 and 350 are part of the top surface 342. The two portions of the split front wall 346 and 350 can be joined by an adjoining wall 348. In certain example embodiments, the split front wall 346 and 350 is not split but a single planar surface.

Once the coupling feature 210 is positioned within the space 352, rotating the trim assembly 102 in a one (e.g., counterclockwise) direction couples the trim assembly 102 to the mounting plate 172. The trim assembly 102 can be decoupled from the mounting plate 172 by rotating the trim in an opposite (e.g., clockwise) direction. In addition, or in the alternative, other coupling features 210 and receiving features 330 can be used to couple and decouple the trim assembly 102 and the mounting plate 172. Examples of other types of coupling that can be used between the trim assembly 102 and the mounting plate 172 can include, but are not limited to, hingedly, threadably, and releasably.

The reflector plate 310 can mechanically couple to the top surface 342. In certain example embodiments, to maintain a minimal air gap with the mounting plate 172, the top surface of the reflector plate 310 is substantially flush with the top surface 342 of the trim assembly 102. In such a case, a recessed border 321 is incorporated into the top surface 342 along some or all of the perimeter of the reflector plate 310. The recessed border 321 can have a depth that is substantially equal to the height of the reflector plate 310.

The reflector plate 310 and/or the top surface 342 can include one or more features to mechanically couple the reflector plate 310 to the top surface 342. For example, as shown in FIG. 3A, the reflector plate 310 can have one or more extensions 314 that protrude from an end of the reflector plate 310. Each extension 314 can have a coupling feature (e.g., an aperture 316, a hinge) that corresponds to a complementary feature (e.g., recessed area 322) and/or coupling feature (e.g., an aperture 324, a hinge receiver) of the top surface 342. In certain example embodiments, a fastening device 318 (e.g., a screw, a bolt) and/or some other coupling means is used to help mechanically couple the reflector plate 310 to the top surface 342.

In certain example embodiments, the example reflector plate 310 is positioned above the wave guide 320 and reflects light received from the wave guide 320 back through the wave guide 320 towards the area to be illuminated. The reflector plate 310 can be made of and/or coated with a highly reflective material. For example, the reflector plate 310 can be made of a white optic material or alternatively can be made of a metallic material and painted with a white high-reflectance paint.

The example wave guide 320 can include a diffuser (not shown). In certain example embodiments, each of the diffuser (if included) the wave guide 320, and the reflector plate 310 have substantially the same shape. The diffuser (if optionally included) can include a first side portion that is at least partially disposed against the wave guide 320 and a second, opposing side portion that faces an area to be illuminated. The use of the diffuser is optional and, when not included, the wave guide 320 can typically be viewed from the area being illuminated. In certain example embodiments, the diffuser is opaque and prevents direct viewing of the wave guide 320 while also helping to more evenly distribute light out from the LED light source (not shown). The example diffuser can be constructed of one or more of a number of materials. For example, the diffuser can be made of plastic or alternatively of a Mylar film that is adhered to the second side of the wave guide 320.

In addition, or in the alternative, the example wave guide 320 can include a lens (not shown). A lens can be positioned below (either coupled to or adjacent to) the wave guide 320, and the lens can be mechanically coupled to one or more portions of the frame 111. A lens can be of any suitable size, color, thickness, texture, opacity, and shape. A lens described herein can also be made of one or more of a number of suitable materials, including but not limited to plastic, such as acrylic, and glass. A lens may be configured to manipulate light emitted by the LED light source in one or more of a number of ways, including but not limited to filtering, diffusion, reflection, and refraction.

The example wave guide 320 is disposed between the diffuser and the reflector plate 310. If a diffuser is not included, a portion of the perimeter of the wave guide 320 can be disposed against the recessed portion 321 and the reflector plate 310. In certain example embodiments, the LED light source is disposed within some or all of the recessed portion 310. The example wave guide 320 has at least one edge that is disposed up against the LED light source to receive the light being emitted by the LED light source and to distribute that light across the wave guide 320 in an effort to create a generally consistent light level across the wave guide 320.

In certain example embodiments, the wave guide 320 abuts the LED light source in order to receive an increased amount of light output by the LED light source. In certain example embodiments, the wave guide 320 is made of acrylic and includes etchings between the top surface and the bottom surface to help distribute the light received from the LED light source evenly or substantially evenly across the surface area of the wave guide 320. In certain example embodiments, the wave guide 320 also includes an etched surface along the portion of the wave guide 320 facing the area to be illuminated to reduce the reflectivity of the outer surface of the wave guide 320.

The wave guide 320 can be of any shape, thickness, and/or other characteristic suitable to be positioned within the trim assembly 102. For example, the wave guide 320 of FIG. 3A can have a tear drop shape. The wave guide 320 can be fed from one side, two sides, or more than two sides. The wave guide 320 can include one or more LED light sources that can emit light in one or more colors. The LED light source can also be of any shape, size, and brightness. The brightness and/or other light distribution can be constant or variable along the perimeter of the wave guide 320.

One or more features can be used to secure the wave guide 320 within the trim assembly 102. For example, the top surface 342 of the trim assembly 102 can have one or more recessed features into which one or more portions of the wave guide 320 can sit. As another example, a spring clip 340 can apply a compressive force to a portion of the wave guide 320 to hold the wave guide 320 in place against an opposing wall and/or feature of the top surface 342 and/or against some other feature (e.g., a circuit board for a LED light source (not shown)).

Figure 4:
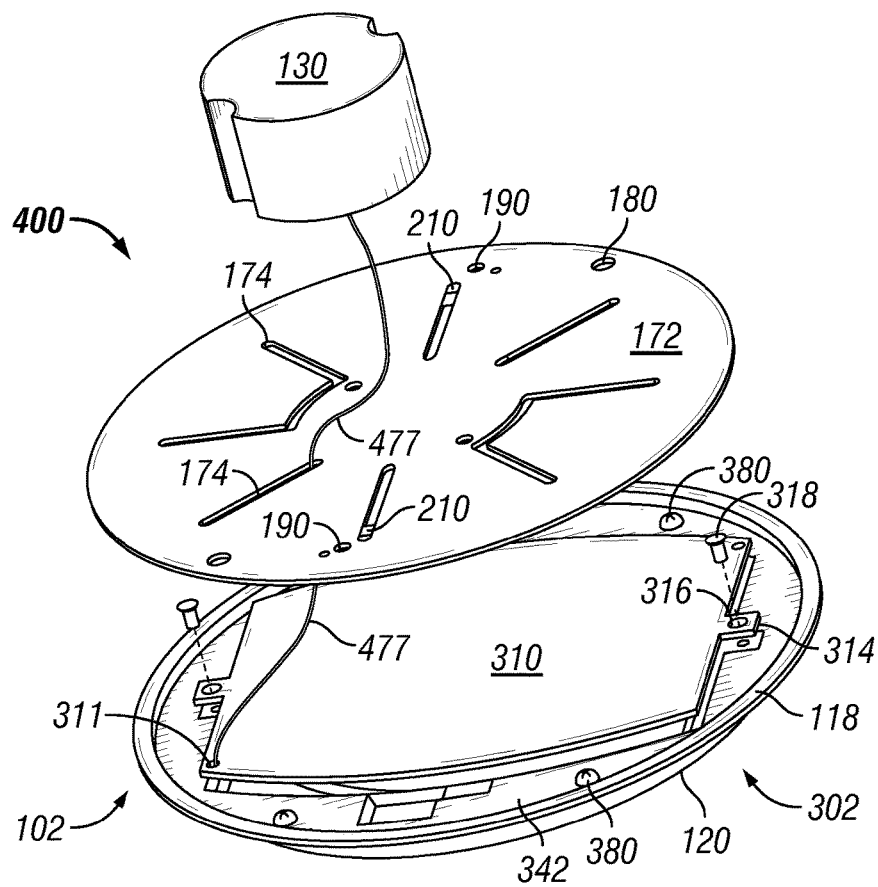
FIG. 4 shows an exploded perspective top-side view of another example LED wave guide down light retrofit fixture in accordance with certain example embodiments.

FIG. 4 shows an exploded perspective top-side view of another example LED wave guide down light retrofit fixture 400 in accordance with certain example embodiments. Specifically, FIG. 4 shows the mounting plate 172 and the trim assembly 102 of the LED retrofit fixture 400. In one or more embodiments, one or more of the components shown in FIG. 4 may be omitted, repeated, and/or substituted. Accordingly, embodiments of a LED retrofit fixture should not be considered limited to the specific arrangements of components shown in FIG. 4.

Referring to FIGS. 1A-4, the LED driver 130 can be electrically coupled to the wave guide 320 and/or one or more LED light sources. In certain example embodiments, one or more physical wires 477 are used to electrically couple the LED driver 130 to the wave guide 320 and/or one or more LED light, sources. In such a case, the physical wires 477 can be fed through a feature (e.g., aperture 311, a notch in a corner) in the reflector plate 310 as well as a slot 174 in the mounting plate 172 so that one end of the wire 477 mechanically and electrically couples to the LED driver 130 while the other end of the wire 477 mechanically and electrically couples to the wave guide 320 and/or the one or more LED light sources. The air gap between the mounting plate 172 and the top surface 342 of the trim feature 102 allows the wire 477 to pass between the mounting plate 172 and the top surface 342 of the trim feature 102 without getting pinched.

Figure 5:
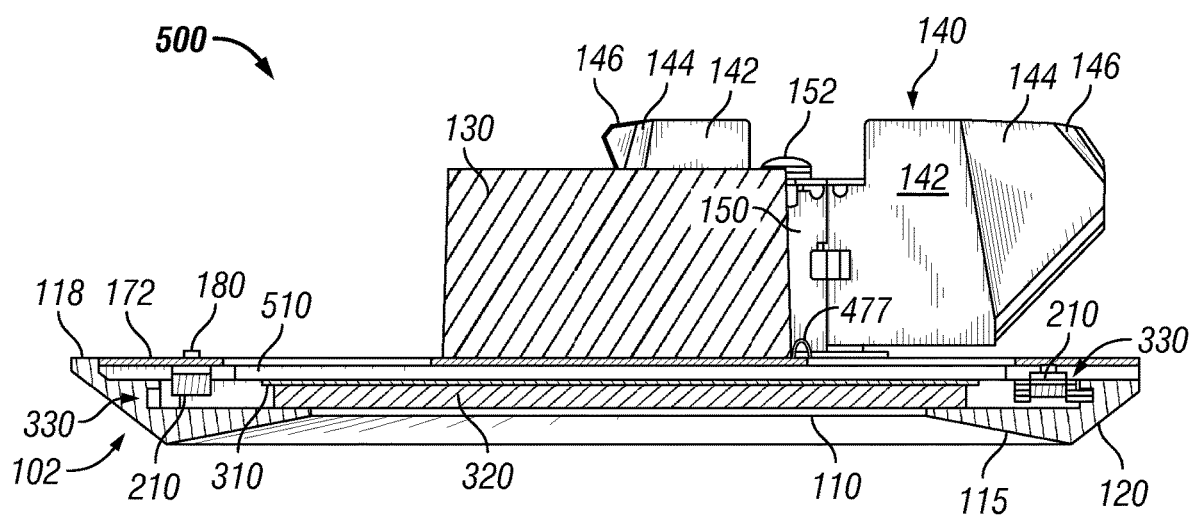
FIG. 5 shows a cross-sectional side view of yet another example LED wave guide down light retrofit fixture for a down can in accordance with certain example embodiments.

FIG. 5 shows a cross-sectional side view of yet another example LED wave guide down light retrofit fixture 500 for a base of an existing fixture in accordance with certain example embodiments. In one or more embodiments, one or more of the components shown in FIG. 5 may be omitted, repeated, and/or substituted. Accordingly, embodiments of a LED retrofit fixture should not be considered limited to the specific arrangements of components shown in FIG. 5. Referring to FIGS. 1A-5, the various components and features of the LED retrofit fixture 500 are substantially the same as those described above with respect to FIGS. 1A-1E. In this example, only one bracket 140 is used to mechanically couple the LED retrofit fixture 500 to the base of an existing fixture. Here, the base of the existing fixture can be a down can.

Figure 6A:
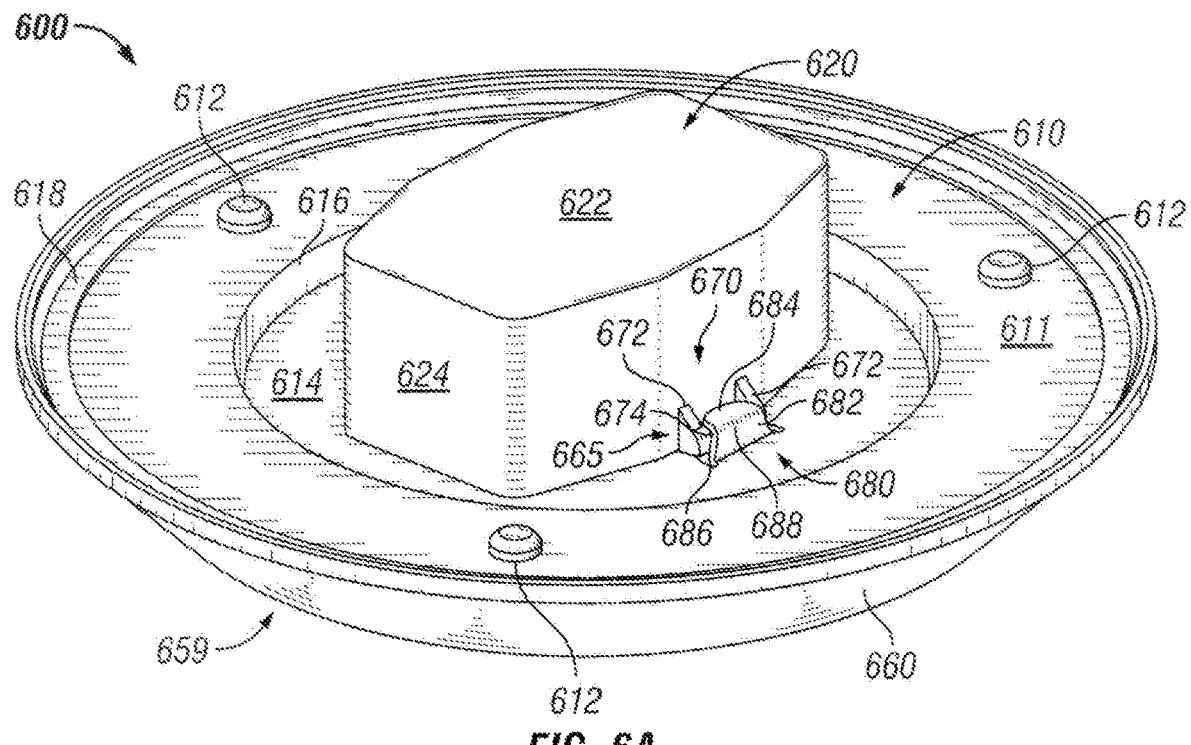
FIGS. 6A and 6B each show a perspective view of an example LED driver securing mechanism for a LED light fixture in accordance with certain example embodiments.
Figure 6B:
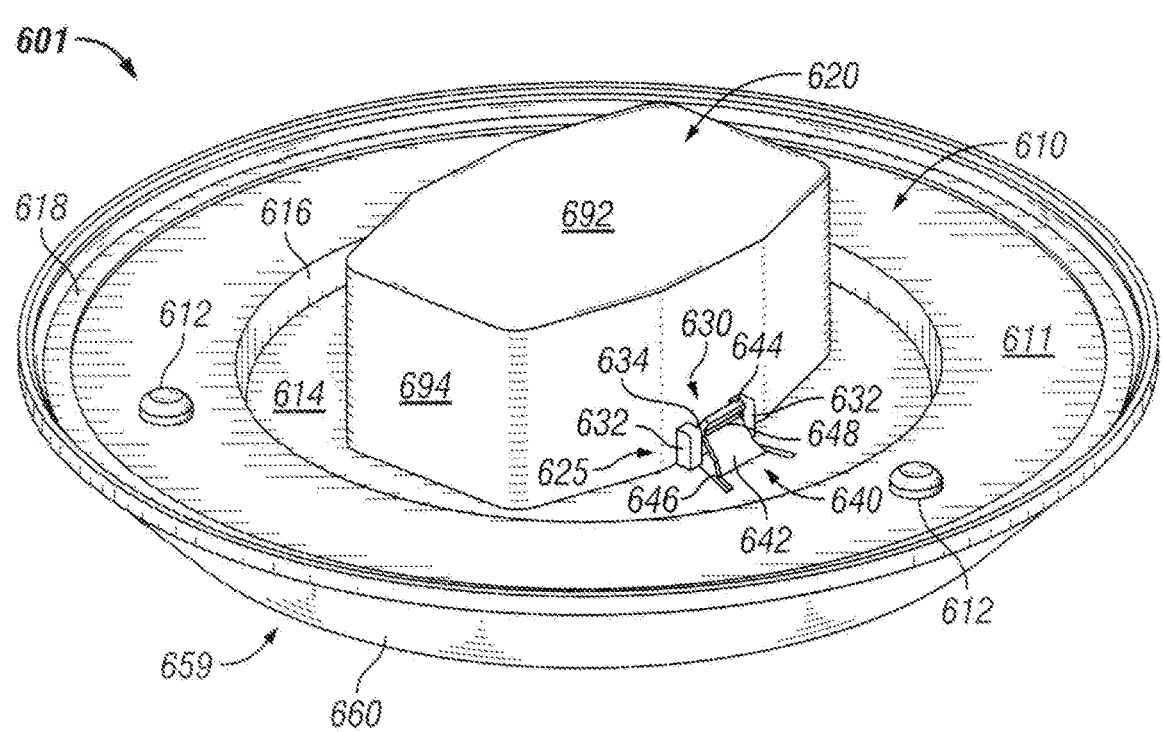

FIGS. 6A and 6B each show a perspective view of an example LED driver securing mechanism for a LED light fixture in accordance with certain example embodiments. In one or more embodiments, one or more of the components shown in FIGS. 6A and 6B may be omitted, repeated, and/or substituted. Accordingly, embodiments of a LED driver securing mechanism should not be considered limited to the specific arrangements of components shown in FIGS. 6A and 6B. For example, the example LED driver securing mechanisms can be used with any type of light fixture that uses a LED driver. For example, example LED driver securing mechanisms can be used with retrofit fixtures and/or new fixtures. In addition, the example LED driver securing mechanisms can be located at any point on and/or within a light fixture.

Referring to FIGS. 6A and 6B, FIG. 6A shows an example securing mechanism 665 for a LED driver 620 where the LED driver 620 is mounted on a top surface of the mounting plate 610 (also called a back plate). The mounting plate 610 can be flat or have, as shown in FIGS. 6A and 6B, one or more recessed areas. Specifically, as shown in FIG. 6A, the LED driver 620 and the securing mechanism 665 are disposed in a recessed area 614 of the mounting plate 610, where the recessed areas 614 is joined to the non-recessed area 611 by a transition area 616. Similarly, as shown in FIG. 6B, the LED driver 690 and the securing mechanism 625 are disposed in a recessed area 614 of the mounting plate 610, where the recessed areas 614 is joined to the non-recessed area 611 by a transition area 616.

The mounting plate 610 can be mounted to the frame 660 of the trim assembly 659 using one or more fastening devices 612 (e.g., screws) that traverse an aperture in the mounting plate 610 (in this case, in the non-recessed area 611 of the mounting plate 610) as well as at least a portion of the frame 660. The trim assembly 659 can also include a lip 618 that creates a boundary inside of which the mounting plate 610 can be positioned.

The LED driver (e.g., LED driver 620, LED driver 690) can have a number of features. For example, as shown in FIG. 6A, the LED driver 620 can have a top end 622 and one or more of a number of sides 624. Disposed on at least one side can be a portion of the securing mechanism 665. Specifically, a receiving feature 670 is disposed on a side 624 of the LED driver 620 in FIG. 6A. The example receiving feature 670 can be of any shape, size, and/or dimensions, and can have any of a number of features. Further, the receiving feature 670 can be made to complement the fastening feature 680 disposed on the mounting plate 610 so that the LED driver 620 can be detachably coupled to the mounting plate 610.

The receiving feature 670 of FIG. 6A includes a pair of anchors 672 that are disposed on either side of a rod 674. The side 624 of the LED driver 620, the anchors 672 and/or the rod 674 can be made from a single piece (as from a mold) and/or can be separate pieces that are mechanically coupled to each other using one or more coupling methods, including but not limited to epoxy, welding, rivets, compression fittings, and fastening devices.

In certain example embodiments, the fastening feature 680 of the securing mechanism 665 is mounted to the mounting plate 610. Here, the fastening feature 680 is mounted to the recessed area 614 of the mounting plate 610. The example fastening feature 680 can be of any shape, size, and/or dimensions, and can have any of a number of features. Further, the fastening feature 680 can be made to complement the receiving feature 670 disposed on the LED driver 620 so that the LED driver 620 can be detachably coupled to the mounting plate 610.

The fastening feature 680 of FIG. 6A is a tab that is hingedly coupled to the mounting plate 610 by a hinge 686. Specifically, the fastening feature 680 includes a base portion 682 that is hingedly coupled to the mounting plate 610. On the other side of the base portion 682 is a curved portion 688 that transitions to a distal portion 684. The combination of the curved portion 688 and the distal portion 684 mechanically couple to the rod 674 of the receiving feature 670, which allows the LED driver 620 to be mechanically coupled to the mounting plate 610. The hinge 686, the portion of the mounting plate 610 where the hinge 686 is disposed, the base portion 682, the curved portion 688, and the distal portion 684 can be made from a single piece (as from a mold) and/or can be separate pieces that are mechanically coupled to each other using one or more coupling methods, including but not limited to epoxy, welding, rivets, compression fittings, and fastening devices.

FIG. 6B shows another example securing mechanism 625. In this case, the receiving feature 630 of FIG. 6B includes a pair of anchors 632 that are disposed on either side of a tab 634. The pair of anchors 632 and/or the tab 634 can be the same or different than the anchors 674 and rod 674 of FIG. 6A. The side 694 of the LED driver 690, the anchors 632 and/or the tab 634 can be made from a single piece (as from a mold) and/or can be separate pieces that are mechanically coupled to each other using one or more coupling methods, including but not limited to epoxy, welding, rivets, compression fittings, and fastening devices.

Further, the fastening feature 640 of FIG. 6B is a tab similar to the tab of FIG. 6A, except that in this case, the tab is reversed so that the distal portion 644 points away from, rather than toward, the LED driver 690. The distal portion 644 can extend from a curved portion 648. A base portion 682 can be hingedly coupled to the mounting plate 610 at one end using a hinge 646 and mechanically coupled to the curved portion 648 at the other end. The back side (hidden from view) of the base portion 682 and/or the curved portion 648 can include one or more features (e.g., a clip) that allow the fastening feature 640 of the securing mechanism 625 to mechanically coupled to the receiving feature 630. For example, a clip on the back side of the curved portion 648 can latch onto a portion of the tab 634. One or more of the components of the fastening feature 640 can be made from a single piece (as from a mold) and/or can be separate pieces that are mechanically coupled to each other using one or more coupling methods, including but not limited to epoxy, welding, rivets, compression fittings, and fastening devices.

In certain example embodiments, the position of the fastening feature and the receiving feature of the securing mechanism can be reversed. For example, fastening feature 640 of the securing mechanism 625 of FIG. 6B can be disposed on the LED driver 690, while the receiving feature 630 can be disposed on the mounting plate 610. When a lighting device (e.g., lighting device 600, lighting device 601) includes multiple securing mechanisms, the components on which each fastening feature and each receiving feature can vary.

In addition to the example mechanical securing mechanisms described herein, a lighting fixture can include one or more electrical coupling features. Such example electrical coupling features can be a connector having a male (or female) end disposed in the mounting plate and a corresponding female (or male) end disposed in an outer surface (e.g., the bottom side) of the LED driver. In such a case, the electrical coupling feature can also serve as a mechanical coupling feature. In certain example embodiments, the electrical coupling feature electrically couples to the electrical mating feature when the mechanical fastening feature (e.g., fastening feature 640) is mechanically coupled to the mechanical coupling feature (e.g., coupling feature 630).

In some cases, the electrical coupling feature is installed by a user at the time the LED driver is mechanically coupled to the mounting plate using the example securing mechanism. For example, wires may protrude from an aperture in the mounting plate, and corresponding wires may protrude from an aperture in the LED driver. In such a case, a user can splice the appropriate wires from the lighting fixture to the corresponding wires from the LED driver before using the example securing mechanism to couple the LED driver to the mounting plate. In certain example embodiments, the LED driver and/or the mounting plate can have one or more features (e.g., a recess, an aperture, a channel) into which the extra lengths of wire and/or the wire splices can be disposed prior to using the example securing mechanism to couple the LED driver to the mounting plate.

Example securing mechanisms described herein can allow a user to easily remove a LED driver from a lighting fixture. Such a need can arise, for example, when a LED driver fails and needs to be replaced, when the type and/or size of LED driver is incorrect and needs to be replaced, and when the LED driver requires maintenance. Example securing mechanisms can be engaged and/or disengaged by a user without the use of a tool (e.g., a screwdriver, a socket driver, a wrench) for the mechanical and/or electrical couplings of the LED driver.

Figure 7:
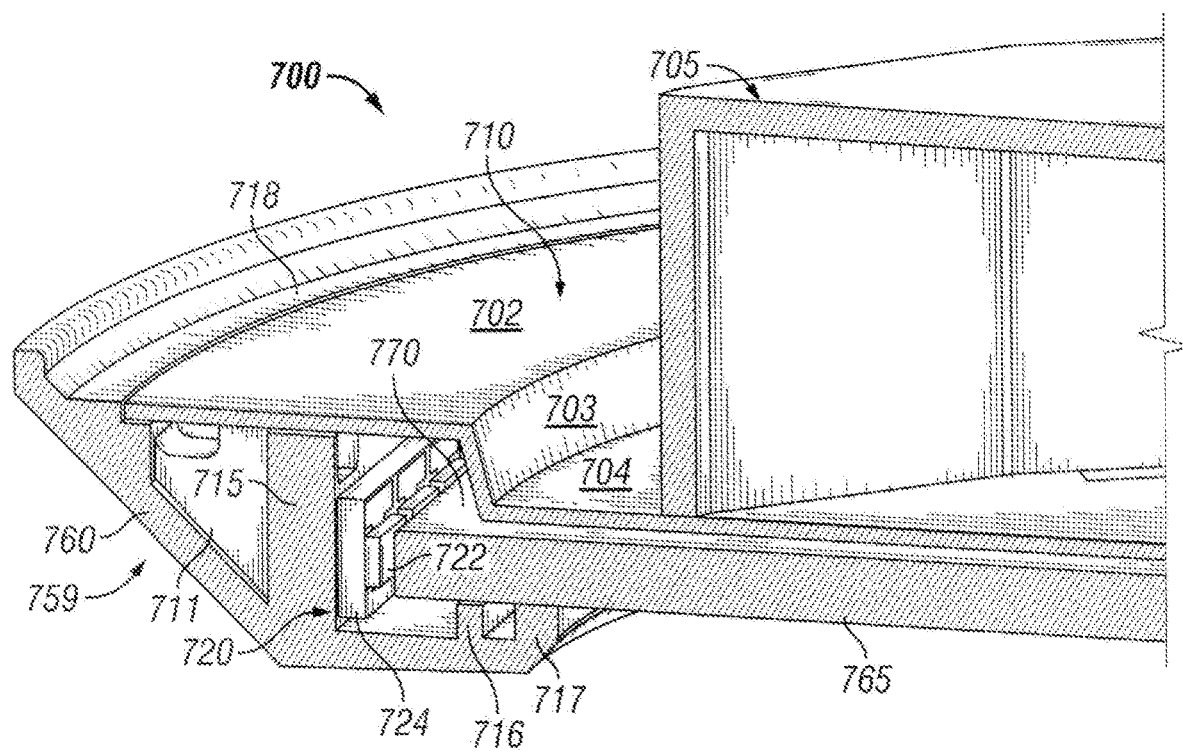
FIG. 7 shows a cross-sectional perspective view of another example LED wave guide down light retrofit fixture in accordance with certain example embodiments.

FIG. 7 shows a cross-sectional side perspective view of another example LED wave guide down light retrofit fixture 700 in accordance with certain example embodiments. In one or more embodiments, one or more of the components shown in FIG. 7 may be omitted, repeated, and/or substituted. Accordingly, embodiments of a LED retrofit fixture should not be considered limited to the specific arrangements of components shown in FIG. 7.

Referring to FIGS. 1A-7, the trim assembly 759 and the mounting plate 710 of the LED retrofit fixture 700 are substantially similar to the trim assembly 659 and the mounting plate 610 of the LED retrofit fixture 600 of FIG. 6A above. The LED driver 705 shown in FIG. 7 can be mechanically coupled to the mounting plate 710 with or without the use of the example securing mechanisms described above with respect to FIGS. 6A and 6B.

Underneath the mounting plate 710, a wave guide 765 and a reflector 770 can be disposed between one or more lighting modules 720. Each lighting module 720 can be mechanically (e.g., removably, slidably) coupled to a standoff 711. The standoff 711 and the rest of the frame 760 can be made from a single piece (as from a mold) and/or can be separate pieces that are mechanically coupled to each other using one or more coupling methods, including but not limited to epoxy, welding, rivets, compression fittings, and fastening devices.

Alternatively, the standoff 711 can be removable, and the lighting module 720 (or portions thereof) are fixedly coupled to the frame 760 of the trim assembly 759. In such a case, at least a portion of the lighting module 720 and the frame 760 can be made from a single piece (as from a mold) and/or can be separate pieces that are mechanically coupled to each other using one or more coupling methods, including but not limited to epoxy, welding, rivets, compression fittings, and fastening devices.

In certain example embodiments, each lighting module 720 includes a backing member 715, a circuit board 724, and a LED light source 722 (also called a LED array). In this example, the backing member 715 of the lighting module 720 forms a single piece with the frame 760, but the backing member 715 can alternatively be mechanically coupled to the frame 760. As discussed above, the frame 760 (and thus, in this case, the backing member 715) is made of one or more of a number of thermally conductive materials and can act as a heat sink, drawing heat generated by one or more heat-generating sources and dissipating the heat.

In a LED lighting fixture, a number of heat-generating sources can exist. Such heat generating sources are usually associated with the electronics, such as the LED driver 705, the circuit board 724, and/or the LED light source 722. For example, the circuit board 724 and/or the LED light source 722 can generate heat when operating, and excessive amounts of heat applied to the circuit board 724 and/or the LED light source 722 can cause the circuit board 724 and/or the LED light source 722 to fail. In such a case, the backing member 715, along with the frame 760, can absorb at least a portion of the heat generated by the circuit board 724 and/or the LED light source 722 and dissipate the heat into the ambient air.

In certain example embodiments, the light generated by the LED light source 722 is directed into a side of the wave guide 765. The reflector 770 can be a top layer of the wave guide 765. Alternatively, the reflector 770 can be a separate member that is disposed on top of the wave guide 765. One or more portions of the frame 759 (e.g., support protrusion 716, support protrusion 717 located adjacent to support protrusion 716, tab (hidden from view, but similar to tab 842 shown in FIG. 8A below)) can be used to support the wave guide 765 and keep the wave guide 765 in position relative to the LED light sources 722.

In LED lighting fixtures known in the art, the voltage delivered to the circuit board 724 by the LED driver 705 is between approximately 0 VAC and 71 VAC. The LED driver 705 receives a higher voltage (e.g., 120 VAC) from an external source and uses a transformer (or some other type of charge transfer device) that is part of the LED driver 705 to reduce the voltage to between 0 VAC and 71 VAC. In such a case, the LED driver 705 is called an isolated driver.

The cost of a LED driver 705 that is an isolated driver is high. A transformer (or some other type of charge transfer device) is an expensive component of the isolated driver. In addition, the transformer itself is relatively inefficient (e.g., 10% losses), and so the heat generated by the transformer (and thus the LED driver 705) can be significant.

Figure 8A:
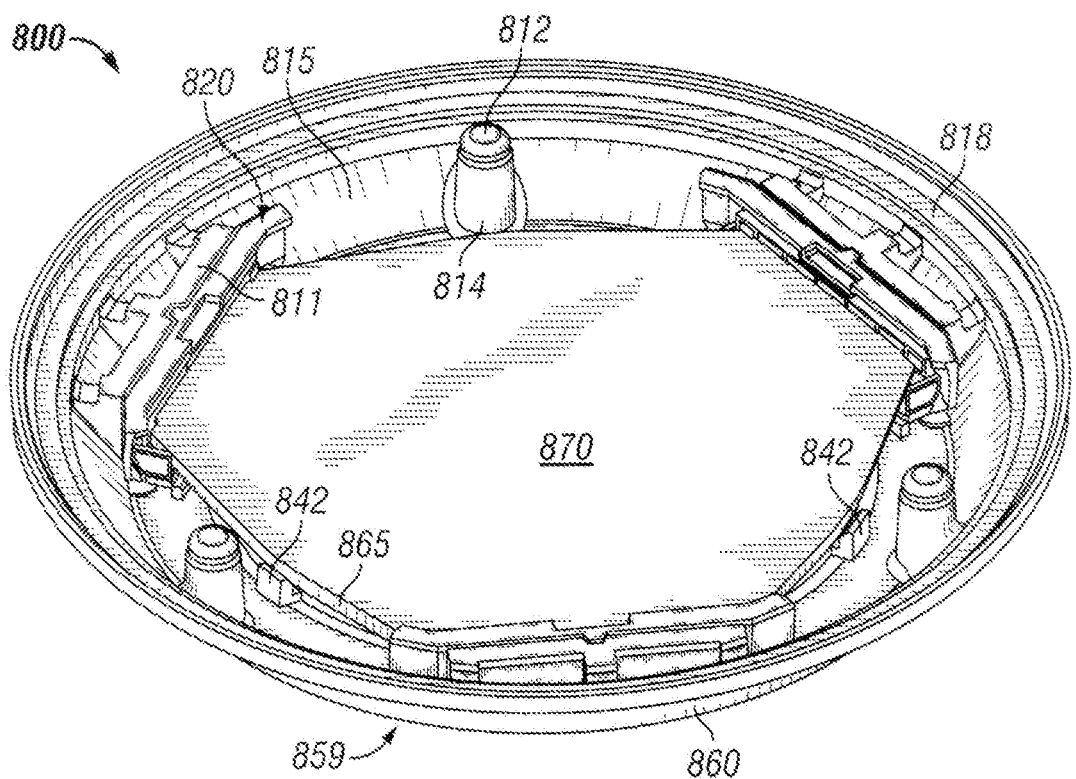
FIGS. 8A and 8B shows various views of yet another example LED wave guide down light retrofit fixture in accordance with certain example embodiments.
Figure 8B:
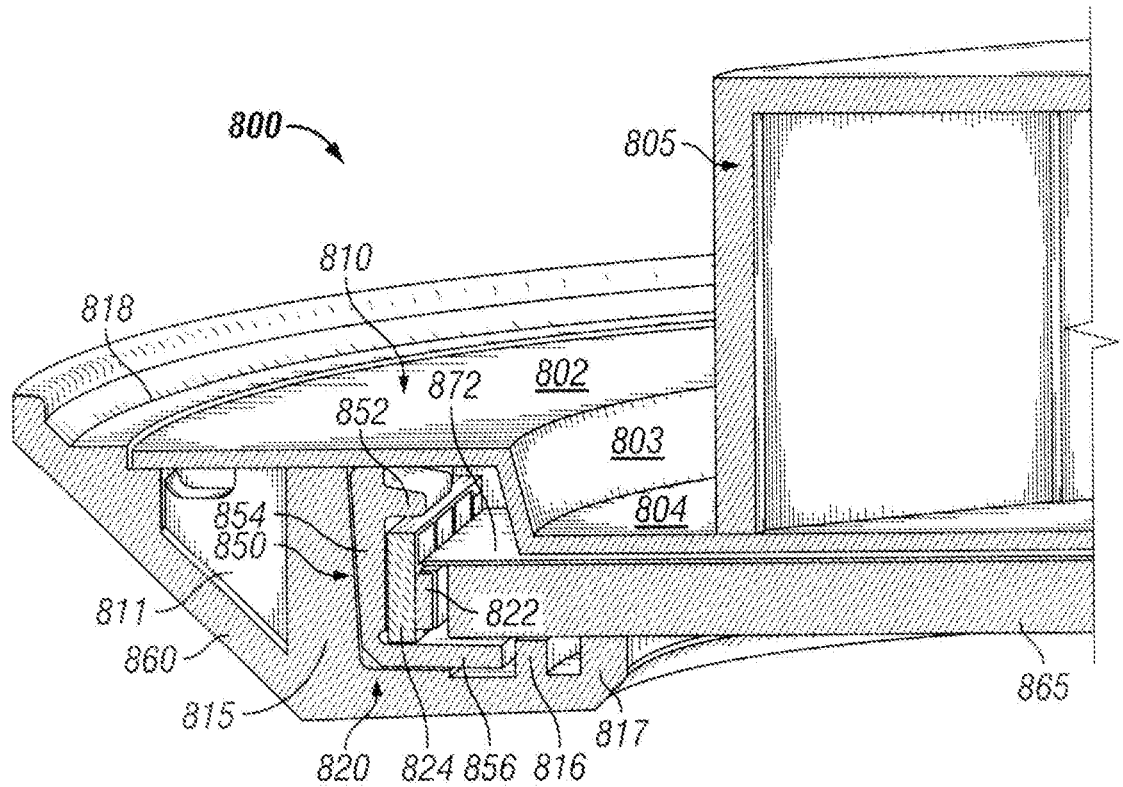

FIGS. 8A and 8B shows various views of yet another example LED wave guide down light retrofit fixture 800 in accordance with certain example embodiments. Specifically, FIG. 8A shows a top perspective view of the LED retrofit fixture 800, and FIG. 8B shows a cross-sectional perspective view of the LED retrofit fixture 800 that includes a non-isolated LED driver 805 with output voltage that exceeds 71 VAC in accordance with certain example embodiments. The LED retrofit fixture 800 of FIGS. 8A and 8B is essentially the same as the LED retrofit fixture 700 of FIG. 7 above, except as described below.

Referring to FIGS. 1A-8B, the non-isolated LED driver 805 of FIGS. 8A and 8B does not include a transformer or other charge transfer device. Therefore, the power delivered by the LED driver 805 to the circuit board 824 of the lighting module 820 can be above 71 VAC. In certain example embodiments, the power delivered to the circuit board 824 (and thus the LED light source 822 or LED array) by the non-isolated LED driver 805 is at least 71 VAC. To compensate for the higher voltage flowing through the circuit board 824 and subsequently through the LED light source 822, one or more components of the circuit board 824 and/or the LED light source 822, as well as the arrangement of such components, can be altered or replaced.

In addition, or in the alternative, in certain example embodiments, the lighting module 820 can include one or more additional components. For example, as shown in FIG. 8, the lighting module 820 can include an example insulator 850 that is disposed between the backing member 815 of the frame 860 and the circuit board 824. The insulator 850 can be made of one or more of a number of materials that have a high amount of thermal conductivity and a low amount of electrical conductivity. An example of such a material is specially-made plastic.

The example insulator 850 can be used to meet the Underwriters Laboratories (UL) requirements for minimum spacing clearance and creepage distance when the voltage of the circuit board 824 is more than 50 VAC. Creepage can be defined as the shortest path between two conductive parts (or between a conductive part and the bounding surface of the equipment) measured along the surface of the insulation. A proper and adequate creepage distance protects against tracking, a process that produces a partially conducting path of localized deterioration on the surface of an insulating material as a result of the electric discharges on or close to an insulation surface. The degree of tracking required depends on, among other factors, the comparative tracking index (CTI) of the material and the degree of pollution in the environment. Tracking that damages the insulating material normally occurs because of one or more of a number of factors, including but not limited to humidity, presence of contamination (e.g., dust), and corrosive chemicals.

Clearance is the shortest distance between two conductive parts (or between a conductive part and the bounding surface of the equipment) measured through air. Clearance distance helps prevent dielectric breakdown between electrodes caused by the ionization of air. The dielectric breakdown level is further influenced by, among other factors, relative humidity, temperature, and degree of pollution in the environment.

The insulator 850 can be mechanically coupled to the circuit board 824 and/or the backing member 815 using one or more of a number of fastening methods, including but not limited to epoxy, welding, rivets, compression fittings, and fastening devices. Alternatively, the insulator 850 can rest freely and be held in place by one or more features (e.g., support protrusion 816, support protrusion 817, tab 842, backing member 815, frame 860, mounting plate 810) of the LED retrofit fixture 800.

Alternatively, in certain example embodiments, the insulator 850 can include one or more features that help secure and/or thermally insulate the circuit board 824 and/or the LED light source 822. For example, as shown in FIG. 8B, the insulator 850 can include a base 856, a back side 854, and a outward protrusion 852, giving the insulator 850 a U-shape or a C-shape. This C-shape of the insulator can increase the creepage and clearance distances without providing a larger, more flat insulator. As a result, the profile of the LED retrofit fixture 800 is reduced.

The base 856 can help align and/or support the circuit board 824 and/or the LED light source 822 from underneath. The back side 854 can provide support for the back side of the circuit board 824. The outward protrusion 852 can help align and/or support the circuit board 824 and/or the LED light source 822 from above. In some or all cases, the various components of the insulator 850 can provide thermal insulation to the circuit board 824 and/or the LED light source 822.

In certain example embodiments, the insulator 850 can be replaced with or augmented by a component with thermally conductive properties. Alternatively, the backing member 815 can be wider and/or have other properties or characteristics (e.g., high thermal conductivity, low thermal conductivity) to allow the circuit board 824 and the LED light source 822 to operate at the higher voltages (more than 71 VAC) delivered by the non-isolated LED driver 805. When the LED driver is isolated, as with the LED driver 705 of FIG. 7, the voltage output is less than 71 VAC. As a result, the creepage and clearance distance requirements are smaller and so can be accomplished by the circuit board 724 without an insulator.

Retrofitting existing fixtures with example embodiments of LED retrofit wave guide down light fixtures allows a user to replace at least a lens and light source of the existing fixture to provide a wave guide LED light source using an down can, junction box, or other base of the existing fixture. By retrofitting the existing fixtures using certain example embodiments, most or all of the existing fixture (except, at times, for the base) can be replaced to provide a different look to the light fixture without complicated electrical and/or mechanical manipulation or expertise. In other words, many issues common to retrofitting a lighting fixture (e.g., rewiring, drilling new holes, repairing a surface, hiring an electrician, buying an entirely new fixture) can be avoided or minimized fixture. Using example embodiments described herein, the light fixture can be more energy efficient, provide particular types of lighting, and be easily changed at some point in the future.

Example securing mechanisms described herein can allow a user to easily remove a LED driver from a lighting fixture. Such a need can arise, for example, when a LED driver fails and needs to be replaced, when the type and/or size of LED driver is incorrect and needs to be replaced, and when the LED driver requires maintenance.

In addition, example non-isolated LED drivers allow for less heat loss at the LED driver, as well as reduced cost of the LED driver. Further, example insulators, mechanically coupled to a circuit board and/or a LED array, can allow higher voltage to be applied to the circuit board and the LED array.

Accordingly, many modifications and other embodiments set forth herein will come to mind to one skilled in the art to which retrofitting existing fixtures with LED retrofit wave guide down light fixtures pertain having the benefit of the teachings presented in the foregoing descriptions and the associated drawings. Therefore, it is to be understood that retrofitting existing fixtures with LED retrofit wave guide down light fixtures is not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A surface-mounted light emitting diode (LED) fixture, comprising:
   a frame comprising a top surface that has a first aperture disposed therethrough;
   a reflector plate removably coupled to the frame, wherein the reflector plate is disposed in the first aperture when the reflector plate is coupled to the frame, wherein the reflector plate has a bottom surface comprising a reflective material, wherein the reflector plate further has an aperture that traverses therethrough, wherein the aperture has a size and a location that are configured to allow for a wire to be disposed therein without affecting light reflected off of the bottom surface.

2. The surface-mounted LED fixture of claim 1, wherein the bottom surface of the reflector plate is disposed above and adjacent to a light guide.

3. The surface-mounted LED fixture of claim 2, wherein the reflector plate is at least as large as the light guide.

4. The surface-mounted LED fixture of claim 1, wherein the reflector plate further comprises at least one extension that includes at least one first coupling feature, wherein the frame comprises at least one recess disposed adjacent to the first aperture, wherein the at least one recess comprises at least one second coupling feature, wherein the first coupling feature and the at least one second coupling feature are coupled to each other when the reflector plate is coupled to the frame.

5. The surface-mounted LED fixture of claim 4, wherein the at least one first coupling feature comprises a second aperture and the at least one second coupling feature comprises a third aperture, wherein the second aperture of the at least one first coupling feature and the third aperture of the at least one second coupling feature have a fastening device disposed therein when the reflector plate is coupled to the frame.

6. The surface-mounted LED fixture of claim 1, wherein the top surface of the frame and the reflector plate form a single plane when the reflector plate is coupled to the frame.

7. The surface-mounted LED fixture of claim 1, further comprising:
   a mounting plate coupled to and disposed atop the frame and the reflector plate.

8. The surface-mounted LED fixture of claim 1, wherein the top surface of the frame further comprises at least one receiving feature for receiving the reflector plate when the reflector plate is coupled to the frame.

9. A surface-mounted light emitting diode (LED) fixture, comprising:
   a frame comprising a top surface;
   a mounting plate removeably coupled to the top surface of the frame, wherein
   when the mounting plate is coupled to the frame the mounting plate acts as a top cover to enclose, a reflector plate, and at least one LED array within the frame; and
   at least one fastening device capable of mounting the mounting plate to a junction box recessed in a ceiling.

10. The surface-mounted LED fixture of claim 9, wherein the top surface of the frame and the mounting plate form a single plane when the mounting plate is coupled to the frame.

11. The surface-mounted LED fixture of claim 9, wherein the mounting plate further comprises at least one first coupling feature, wherein the frame comprises at least one second coupling feature, wherein the at least one first coupling feature and the at least one second coupling feature are coupled to each other when the mounting plate is coupled to the frame.

12. The surface-mounted LED fixture of claim 9, further comprising:
   a LED driver mechanically coupled to an upper surface of the mounting plate, wherein the LED driver is electrically coupled to the at least one LED array.

13. The surface-mounted LED fixture of claim 12, wherein the LED driver is removably coupled to the mounting plate.

14. A light emitting diode (LED) fixture, comprising:
   a planar light guide located inside a frame;
   at least one LED array disposed adjacent to at least one side of the planar light guide, wherein the at least one LED array directs light into the at least one side of the planar light guide;
   a mounting plate; and
   at least one fastening device capable of mounting the mounting plate to a junction box recessed in a ceiling, wherein the mounting plate includes at least one coupling feature used to removably couple the mounting plate to the frame.

15. The LED fixture of claim 14, further comprising:
   a reflector plate disposed adjacent to a top surface of the planar light guide, wherein the reflector plate comprises a reflective material that reflects light emitted by the at least one LED array.

* * * * *